J. BRODIE.
Ore Stamp.
No. 42,743.   Patented May 17, 1864.
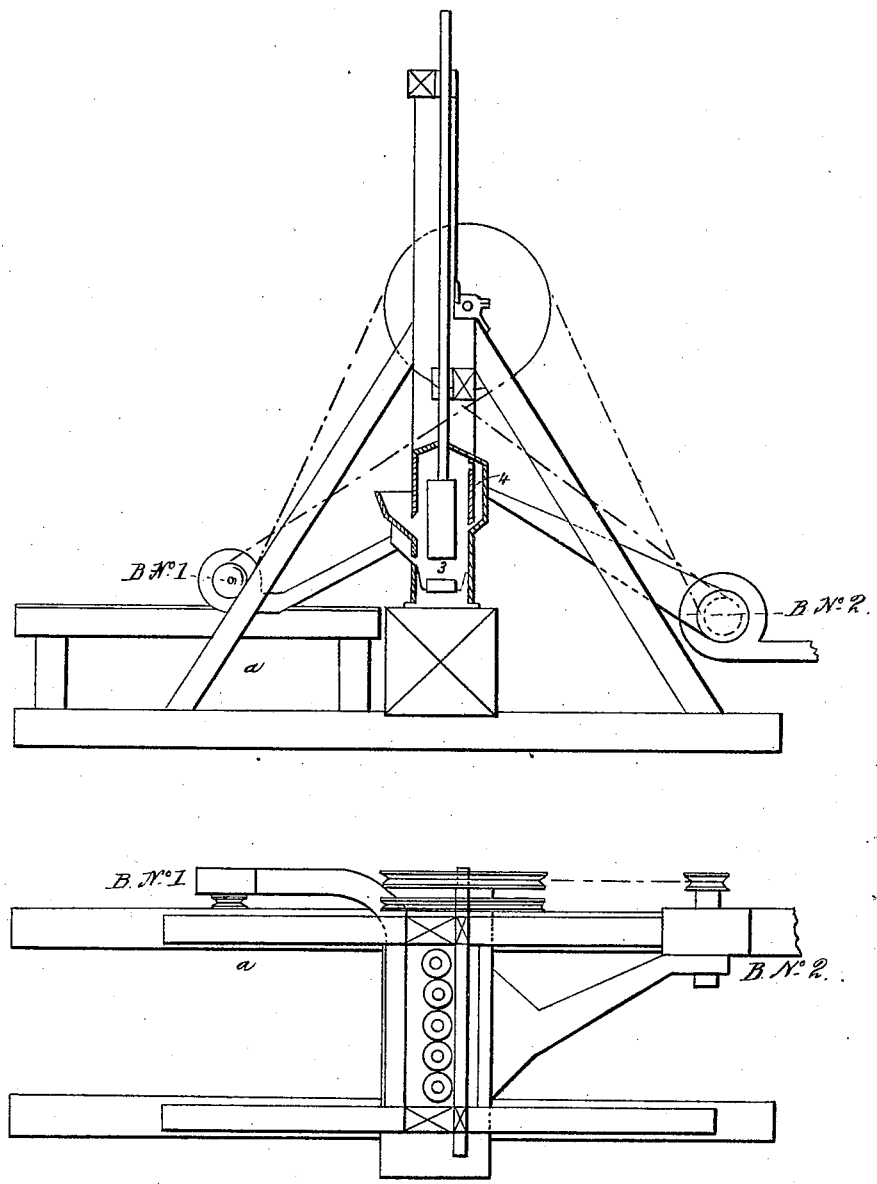
Witnesses:
Inventor:
James Brodie

UNITED STATES PATENT OFFICE.

JAMES BRODIE, OF SAN FRANCISCO, CALIFORNIA.

IMPROVED DEVICE FOR COLLECTING THE DUST FROM STAMP-MILLS AND CRUSHERS.

Specification forming part of Letters Patent No. 42,743, dated May 17, 1864.

*To all whom it may concern:*

Be it known that I, JAMES BRODIE, of the city and county of San Francisco, State of California, have invented a new and useful improvement on a machine for the purpose of separating and saving the fine pulverized dust from the coarser particles of crushed gold and silver rock or ores, to be applied in or out of a crushing-machine, and known as "Brodie's Wind-Blast Separator;" and I hereby declare that the following is full, clear, and exact description of the construction and operation of the same, reference being had to annexed drawings, making a part of this specification, in which—

Letters A A exhibit plan and elevation of the ordinary stamp-battery with improvement attached.

Letter B, No. 1, exhibits improvement, which is a blow pipe or tube from a fan-blower, creating a wind-blast, introduced into battery at Figure 3 through the blow pipe or tube, which throws the wind under the stamp, thereby separating the fine pulverized dust from the larger particles of the materials crushed by stamps.

Letter B, No. 2, exhibits improvement, and is the suction-pipe of a fan-blower introduced into the battery at Fig. 4, which is used for carrying off the fine dust forced from the materials being crushed by the force of the wind-blast created by B, No. 1, and conveying the said fine dust to a place of deposit outside the battery.

What I claim as my improvement, and for which I ask Letters Patent, is—

The introduction of the wind-blast, through blow pipes or tubes, into batteries or other crushing-machines, (as exhibited and applied in drawings,) for the purpose of saving the fine dust arising from said crushings.

JAMES BRODIE.

Witnesses:
J. D. STEVENSON,
GEORGE MORGAN.